United States Patent

Kishi et al.

[11] 4,084,243
[45] Apr. 11, 1978

[54] CUTTER RADIUS COMPENSATION SYSTEM

[75] Inventors: Hajimu Kishi; Masashi Takahashi, both of Tokyo, Japan

[73] Assignee: Oki Electric Industry Co., Ltd., Tokyo, Japan

[21] Appl. No.: 686,042

[22] Filed: May 13, 1976

[30] Foreign Application Priority Data

May 19, 1975 Japan .................................. 50-58721
Jun. 25, 1975 Japan .................................. 50-77565

[51] Int. Cl.² ............................................ B24B 17/00
[52] U.S. Cl. .................................. 364/474; 51/165.71
[58] Field of Search ........... 51/165.87, 165.88, 165.71, 51/105 EC, 101 R; 318/572; 235/151.11

[56] References Cited

U.S. PATENT DOCUMENTS

| | | | |
|---|---|---|---|
| 3,482,357 | 12/1969 | Inaba et al. | 51/101 R X |
| 3,500,150 | 3/1970 | Foster | 318/572 |
| 3,621,614 | 11/1971 | Hikita et al. | 51/101 R |

*Primary Examiner*—Eugene G. Botz
*Attorney, Agent, or Firm*—Kenyon & Kenyon

[57] ABSTRACT

In an NC tool machine having at least a linear control axis and a rotational control axis, a cutter compensation for compensating the difference between a programmed cutter radius and an actual cutter radius is automatically performed by calculating at least the locus of the actual cutter so that the programmed cutter touches the same position of a workpiece as the actual cutter does.

2 Claims, 5 Drawing Figures

4,084,243

CUTTER RADIUS COMPENSATION SYSTEM

BACKGROUND OF THE INVENTION

The present invention relates to a cutter compensation system in a machine tool, and in particular, relates to a cutter compensation system for compensating the difference between the programmed cutter size and the actual cutter size of N.C. machine.

It is already known to compensate the above difference in a machine tool having only a linear control axis but no rotational control axis. However no effective system has been proposed for compensating the above difference having both a linear control axis and a rotational control axis which are controlled simultaneously. Therefore, when such a difference occurs in a prior art, a new numerical control data for an actual tool size must be prepared. Thus, the preparation of NC data costs very expensive and the NC data control and tool handling are very troublesome. Further, such conventional method has occasionally caused the cutting capability of a machine tool to be considerably reduced.

SUMMARY OF THE INVENTION

Accordingly, the principle object of the present invention is to eliminate the above drawbacks of a prior art.

The other object of the present invention is to provide a cutter radius compensation system having both a linear control axis and a rotational control axis, said system permitting the cutting with a single programmed data even when an actual cutter radius is different from the programmed cutter radius.

The above objects are attained by the present cutter compensation system for a machine tool having a linear control axis and a rotational control axis comprising the steps of obtaining an NC data from an NC unit, obtaining a compensation value which is the difference between a programmed cutter radius stored in the NC unit and a cutter radius of an actual cutter, calculating the locus of a compensation cutter on a workpiece so that the programmed cutter touches the same point of the workpiece as the compensation cutter does, and controlling simultaneously the linear control axis and the rotational control axis using the result of the above calculation.

BRIEF DESCRIPTION OF THE DRAWINGS

The foregoing and other objects, features and attendant advantages of the present invention will be appreciated as the same become better understood by means of the following description and the accompanying drawings wherein.

DESCRIPTION OF THE PREFERRED EMBODIMENT

Figure 1:
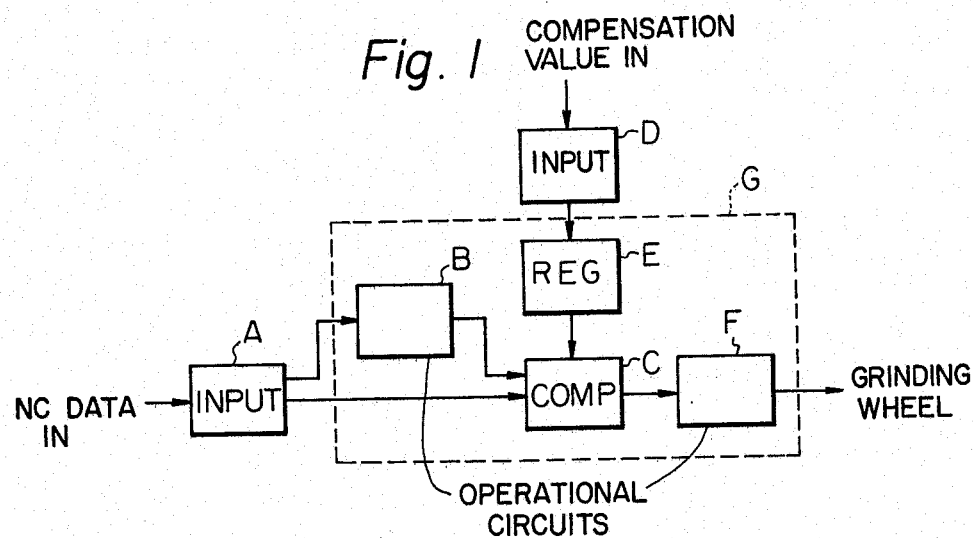
FIG. 1 is a brief block diagram of a cutter compensation system according to one embodiment of the present invention.

Referring now to FIG. 1, the block diagram shows a grinding wheel cutter compensation system adopted in a cam grinder, according to the present invention. In FIG. 1, the reference symbol A denotes an input unit for receiving an NC data into the present system, B is an operational circuit to sum the incremental control variables of the NC data, C is a second operation circuit to calculate the position of a grinding wheel having a radius different from a programmed one, and D denotes another input unit for receiving a compensation value, namely, the difference between the programmed and actual radii of a grinding wheel. The numeral E denotes a register to store the compensation data provided through the input unit D, F is a further operational circuit to calculate the incremental control variable of the actual grinding wheel, and the numeral G denotes a compensation calculation circuit-block comprising the operational circuits B, C and G, and the register E.

Figure 2:
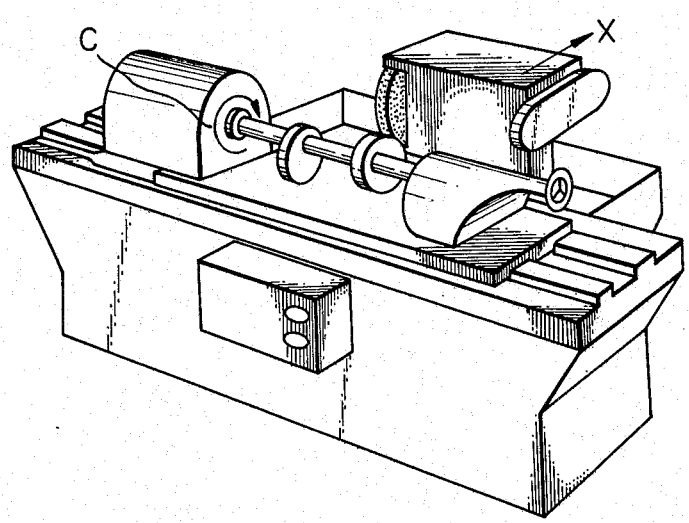
FIG. 2 is a perspective view showing a cam grinder, by way of example, controlled by the cutter compensation system shown in FIG. 1.

FIG. 2 is a perspective view of a cam grinder, by way of example, controlled by the grinding wheel-cutter compensation system shown in FIG. 1, which grinder having the grinding wheel linear axis X and the rotational control axis C controlled linearly and pivotally, respectively, simultaneously.

Figure 3:
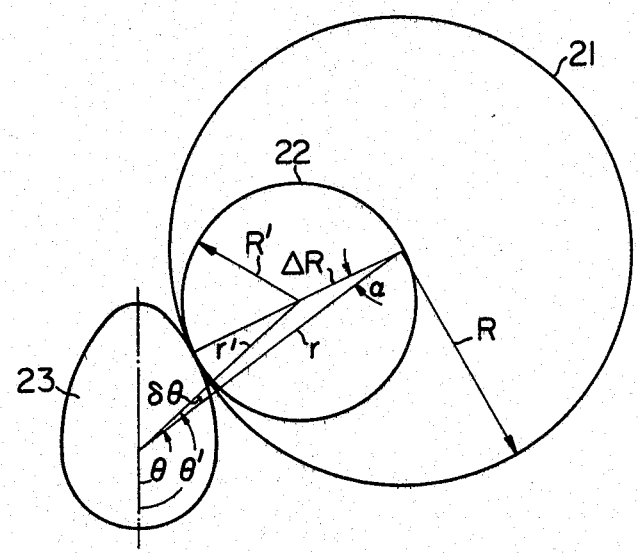
FIG. 3 explains how the cam and a cutter touch with each other.

FIG. 3 explains how the programmed and actual grinding wheels and a cam are in contact between them when grinding the cam. The reference numerals used in FIG. 3 designate as follows: The numeral 21 is for a programmed grinding wheel, 22 is for an actual grinding wheel and the numeral 23 is for a cam to be ground.

Figure 4:
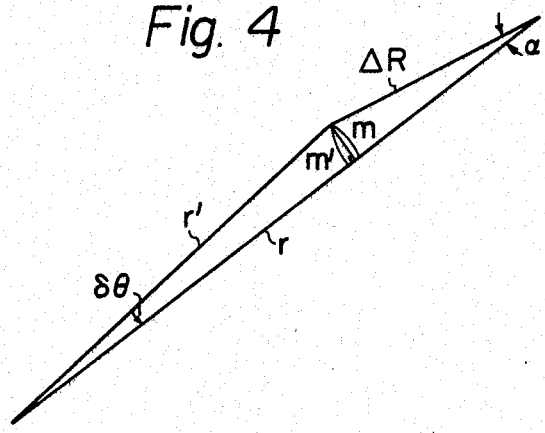
FIG. 4 is a partial view, at a greater scale, of FIG. 3.

FIG. 4 is a partial view, at a greater scale, of FIG. 3. In FIGS. 3 and 4, the reference symbol R denotes a programmed grinding wheel radius, R' an actual grinding wheel radius, $\Delta R$ is for a grinding wheel radius compensation of $\Delta R = R - R'$, $r$ and $r'$ are for control variables for the linear control axis for the grinding wheel radii of R and R', $\theta$ and $\theta$ are for control variables for the pivotally control spindle for the grinding wheel radii of R and R', and the symbol $\delta\theta$ denotes a difference for the pivotally control axis, of $\delta\theta = \theta' - \theta$, respectively.

The above embodiment operates as follows: First, incremental control variables $\Delta r$ and $\Delta \theta$ of the axes X and C are applied to the system through the first input unit A, and sent to the first and second operational circuits B and C. In the operational circuit B, the input incremental control variables $\Delta r$ and $\Delta \theta$ are added together to calculate the respective sums $r = \Sigma \Delta r = r_0 + \Delta r$ and $\theta = \Sigma \Delta \theta = \theta_0 + \Delta \theta$. The calculated results are stored in the first operational circuit B and simultaneously applied to the second operational circuit C. In the second operational circuit C, the values $r'$ and $\theta'$ of each control axes for the grinding wheel radius R' (for the compensation grinding wheel) are obtained from the $\Delta R$ which is received in the input unit D and is stored in the register E, $\Delta r$ and $\Delta \theta$ from the input unit A, and $r$ and $\theta$ which are values for each control axes for the grinding wheel radius R (programmed radius), and the results $r'$ and $\theta'$ are applied to the operational circuit F. The operational circuit F stores the values $r'$ and $\theta'$, and calculates the incremental control values $\Delta r = r - r_0$ and $\Delta \theta = \theta - \theta_0$. In this opeational circuit, incremental control variables $\Delta r' = r' - r_0'$ and $\Delta \theta' = \theta' - \theta_0'$, of the compensation grinding wheel are determined from the values $r'$, and $\theta'$ of the axes for the wheel, calculated by the second operational circuit C, and simultaneously the values r' and θ' are stored in the third operational circuit F.

With the foregoing operations repeated, the incremental controlled variables δr and δθ of the axes for the compensation grinding wheel are determined one after another, and the cam grinding shown in FIG. 2 is controlled according to these incremental control variables.

In the above operation, in the operational circuit C, values r' and θ' of the axes for the grinding wheel radius of R', namely, for the compensation grinding wheel radius, are calculated as follows:

Referring to FIGS. 3 and 4, the values r' and θ' are determined by approximation as follows: For the value r', $$r' = r - \Delta R \cos\alpha \quad (1)$$

For the value θ', since $m = r' \cdot \delta\theta'$ and $m' = \Delta R \cdot a$ are satisfied, $\delta\theta = \Delta R \cdot a/r'$, where $m$ is assumed to be equal to $m'$. Accordingly, $$\theta' = \theta + \delta\eta + \Delta R \cdot a/r' \quad (2)$$

The angle α in the equations (1) and (2) are calculated as follows:

$$\alpha = \tan^{-1} 1/r \cdot \delta r/\delta\theta \quad (3)$$

Substituting δr/δθ to Δr/Δθ, 1/r·Δr/Δθ to (a), and neglecting the higher-ordered term as to (a) by expanding the $\tan^{-1}$ in series, and $$\alpha = a - a^3/3 \quad (4)$$

By substituting the equation (4) into (1) and neglecting the higher-ordered term as to (a) by expanding the cos in series, the value r' is given as follows:

$$r' = r - \Delta R (1 - a^2/2) \quad (5)$$

where $a = 1/r \cdot \Delta r/\Delta\theta$.

Further, substituting the equation (4) into (2) and neglecting the higher-ordered term as to (a), and the value θ' is given as follows:

$$\theta' = \theta + \Delta R \cdot a/r'$$

$$\theta' = \theta + \Delta R \cdot a/(r - \Delta R(1 - a^2/2)) \quad (6)$$

where $a = 1/r \cdot \Delta r/\Delta\theta$.

Thus, a control variable r' for the linear control axis and θ' for the rotational control axis, of the actual grinding wheel are provided from the control variable r for the linear control axis and θ for the rotational control axis, of the programmed grinding wheel, and from the respective compensations δr and δθ, namely, $$\delta r = -\Delta R(1 - a^2/2)$$

$$\delta\theta = \Delta R \cdot a/(r - \Delta R(1 - a^2/2))$$

By calculating sequentially these control variables r' and θ', incremental control variables Δr' and Δθ' for the respective control axes of the actual grinding wheel are obtained to control the cam grinder.

Table 1 below shows an example list of compensations δr and δθ for the respective control axes, control variables r' and θ' for the respective control axes of actual grinding wheel, and incremental control variables Δr' and Δθ' for the respective cases for the cam grinder of the grinding wheel where the compensation value ΔR = −5.0mm.

Table 1

| Programmed wheel | | | | Compensation | | | Actual wheel | | |
|---|---|---|---|---|---|---|---|---|---|
| r | Δr | θ | Δθ | δr | δθ | r' | Δr' | θ' | Δθ' |
| 293.3050 | | 118.4800 | | −5.0000 | 0.0000 | 288.3050 | | 118.4800 | |
| 293.4970 | 0.1920 | 124.7800 | 6.3000 | −4.9998 | 0.0001 | 288.4972 | 0.1922 | 124.7801 | 6.3001 |
| 296.7350 | 3.2380 | 140.5000 | 15.7200 | −4.9960 | 0.0391 | 291.7390 | 3.2418 | 140.5391 | 15.7590 |
| 299.4340 | 2.6990 | 159.9500 | 19.4500 | −4.9982 | 0.0258 | 294.4358 | 2.6968 | 159.9758 | 19.4367 |

Figure 5:
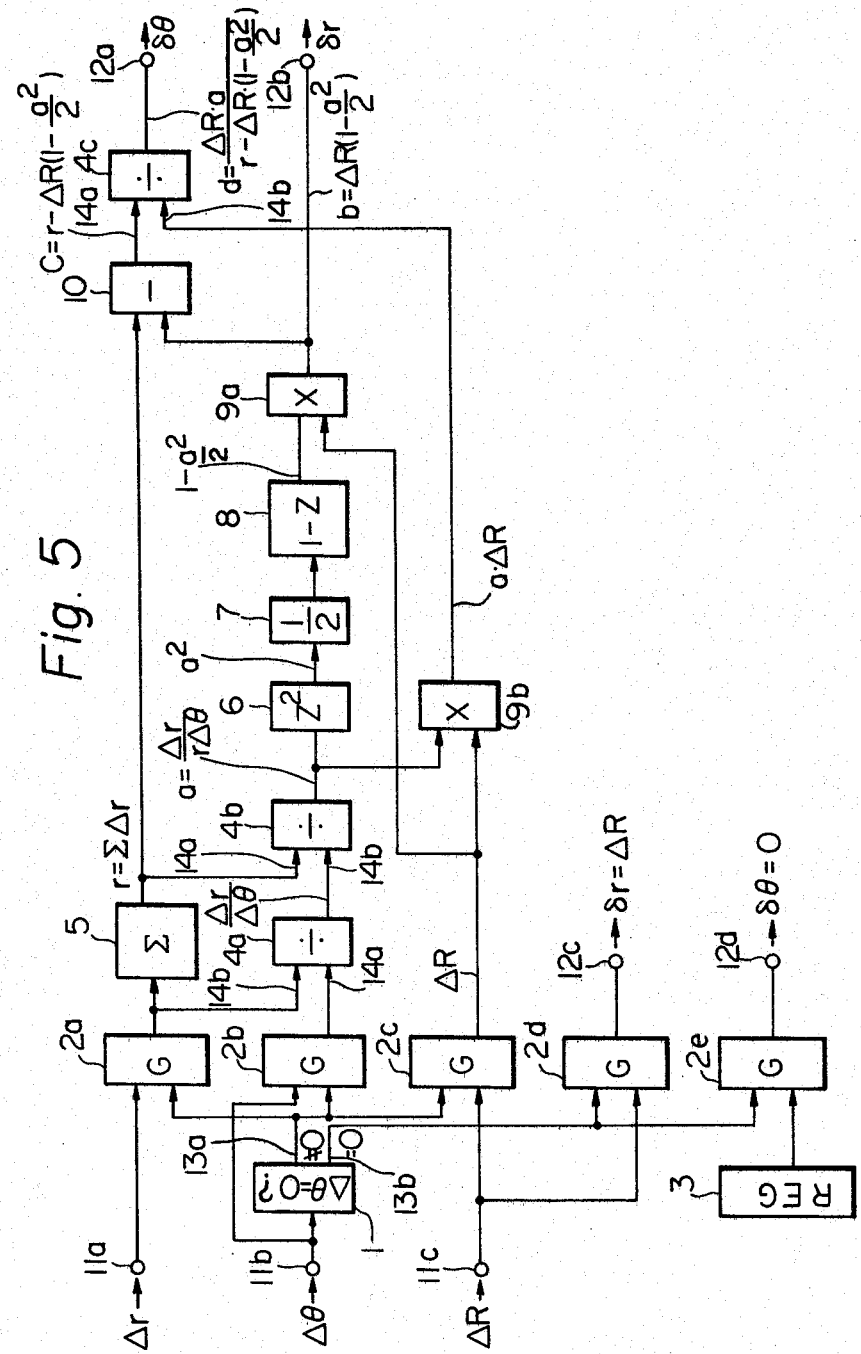
FIG. 5 is a detailed block-diagram of a compensation calculation circuit.

FIG. 5 shows a circuit diagram for sulfiling the above calculation.

Referring now to FIG. 5, the block diagram illustrates one embodiment of a cutter radius compensation system according to the present invention. In FIG. 5, the reference numeral 1 denotes a decision circuit, 2a, 2b, 2c, 2d and 2e are gate circuits, 3 denotes a register in which a signal "0" is stored 4a, 4b and 4c denote divider circuits, 5 is an accumulative adder circuit, 6 is a square-multiplier circuit. The numeral 7 denotes a half-multiplier circuit, 8 is a complement calculation circuit to provide the complement of "1," 9a and 9b are multiplier circuits, 10 denotes a subtraction circuit, 11a, 11b and 11c denote input terminals, 13a and 13b are output terminals of the decision circuit 1, and the numerals 14a and 14b denote input terminals of the subtractor circuits 4a, 4b and 4c.

When the input terminals 11a, 11b and 11c receive an incremental control variable Δr for the linear control axis, incremental control variable Δθ for the rotational control axis and a cutter radius compensation ΔR, respectively, the decision circuit 1 will decide whether or not the incremental control variable Δθ is "0." When this incremental control variable Δθ is not zero, that is, the variable is positive or negative, a control signal "1" and "0" are put out of the terminals 13a and 13b, respectively. On the contrary, if the incremental control variable Δθ is zero, control signals "0" and "1" are delivered from the terminal 13a and 13b, respectively. The output terminal 13a is connected to the gate circuits 2a, 2b and 2c, while the terminal 13b is connected to the gate circuits 2d and 2e. Each of these gate circuits becomes conductive when a control signal "1" is put into the gate circuit, but the circuit will be non-conductive when it is supplied with a control signal "0." Thus, when the incremental control variable Δθ for the rotational control axis is not zero, the variable Δr passes through the gate circuit 2a to the accumulative adder circuit 5 and divider circuit 4a. Said incremental control variable Δθ will pass through the gate circuit 2b to the divider circuit 4a, while the compensation of a cutter radius ΔR passes through the gate circuit 2c to the multiplier circuits 9a and 9b. On the other hand, if the variable Δθ is zero, the variable ΔR will pass through the gate circuit 2d and be delivered as compensation δr for the linear control axis from the output terminal 12c. The signal "0" stored in the register 3 will pass through the gate circuit 2e and be delivered as compensation $\delta\theta$ for the rotational control axis from the output terminal 12d.

Now, when the incremental control variable $\Delta\theta$ for the rotational control axis is not zero, the accumulative adder circuit will provide an accumulative sum $r(r=\Sigma\Delta r)$ of the incremental control variables $\Delta r$ for the linear control axis, which sum being in turn supplied to the subtraction circuit 10 and divider circuit 4b. In the divider circuit 4a, a division is conducted by taking as divident the incremental control variable $\Delta r$ of the linear control axis, supplied from the gate circuit 2a and as divisor the variable $\Delta\theta$ of the rotational control axis, supplied from the gate circuit 2b. This output is put in the divider circuit 4b. It should be noted here that the divider circuits 4a, 4b and 4c have two input terminals 14a and 14b, one of the terminals 14a being supplied with a divisor while the other terminal 14b is supplied with a divident. Further, said divider circuits have output terminals to provide quotients each of which has a decimal part consisting of proper effective digits. Thus, the divider circuits are real-number type operational circuits. The dividers circuit 4b performs a division of $a=(\Delta r/\Delta\theta)/r$ by taking as divident the input $\Delta r/\Delta\theta$ supplied from the divider circuit 4a and as divisor the accumulative sum $r$ supplied from the accumulative adder circuit 5. This output from the divider circuit 4b is supplied to the multiplier circuit 9b and square-multiplier circuit 6. In the circuit 9b, a multiplication is conducted of the result $(a=\Delta r/r\Delta\theta)$ supplied from the divider circuit 4b, by the tool radius compensation $\Delta R$ supplied through the gate circuit 2c. This multiplication result $a\cdot\Delta R$ is supplied as input to the divider circuit 4c. On the other hand, the output $(a)$ of the divider circuit 4b, to the square-multiplication circuit 6 is squared, then is applied to the half-multiplication circuit 7 where the signal is halved. The output $\frac{1}{2}(a)^2$ from this half-multiplication circuit 7 is applied to the complement calculation circuit 8 which is turn calculates a complement of "1" of the signal $\frac{1}{2}(a)^2$. The output $1-a^2/2$ from the circuit 8 is put into the multiplier circuit 9a where a multiplication is performed of the output from the complement calculation circuit 8, by the tool radius compensation $\Delta R$ supplied from the gate circuit 2c, to provide an output of $\Delta R\cdot(1-a^2/2)$ which is supplied as input to the subtraction circuit 10 and at the same time delivered as compensation $-\delta r$ for the linear control axis from the output terminal 12b. In the subtraction circuit 10, a subtraction operation is conducted of said output of the multiplier circuit 9a from the accumulative sum $(r)$ supplied from the accumulative adder circuit 5. The difference $r-\Delta R\cdot(1-a^2/2)$ thus obtained is supplied to the divider circuit 4c where it is taken as divisor and the multiplication result R $(a)$ from the multiplication circuit 9a is taken as divident. The quotient $\Delta R\cdot a/(r-\Delta R\cdot(1-a^2/2))$, output of the divider circuit 4c is delivered as a compensation $\delta\theta$ for the rotational control axis out of the terminal 12a. Briefly speaking, with the circuit configuration according to the present invention, when the incremental control variable for the rotational control axis is positive or negative value, $\delta r=-\Delta R\cdot(1-a^2/2)$ and $\delta\theta=\Delta R\cdot a/(r-\Delta r\cdot(1-a^2/2))$ are provided as compensations for the linear and rotational control axes, respectively. On the other hand, when the variable $\Delta\theta$ for the rotational control axis is zero, $\delta r=\Delta r$ and $\delta\theta=0$ are provided as such compensations, respectively. The cutter compensation system may be applied not only to the cam grinder as described in the above, but also to a machine tool such as milling machine, machining center, or others. In addition, the present invention can be utilized in a machine tool having another control axis as well as the linear and rotational control axes, in which the difference of cutter radius affects only the latter two axis positions.

As seen in the foregoing, the cutter compensation system according to the present invention permits any machine tool with the tool and work axes controlled linearly and rotationally respectively, to cut the workpiece by a tool of a radius different from a programmed cutter radius. That is to say, since the present invention eliminates the necessity of preparing NC data for different cutter radii, the cost of NC data preparation may be reduced and the tool handling and NC data control may be very simplified, thus improving the production capability by cutting.

From the foregoing it will now be apparent that a new and improved cutter radius compensation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A cutter radius compensation method for controlling a machine tool having a linear control axis and a rotational control axis, said method comprising the steps of obtaining NC data from a NC unit, obtaining a compensation value which is the difference between a programmed cutter radius stored in the NC unit and a cutter radius of an actual cutter, calculating using the compensation value the locus of a compensation cutter on a workpiece so that the programmed cutter touches the same point of the workpiece as the compensation cutter does, and controlling simultaneously the linear control axis and the rotational control axis using the result of the above calculation.

2. A method (for) in accordance with claim 1 wherein the step of calculating the locus of a compensation cutter comprises the steps of:

(a) when the incremental control variable of the rotational control axis being not zero; dividing an incremental control variable $\Delta r$ of the linear control axis by said incremental control variable $\Delta\theta$ of the rotational control axis, obtaining a quotient $(a=\Delta r/r\Delta\theta)$ by dividing the quotient $(\Delta r/\Delta\theta)$ of the above division by the accumulated sum $(r=\Sigma\Delta r)$ of the incremental control variable $\Delta r$ of the linear control axis, obtaining the value $(1-a^2/2)$ by calculating $(a)$ squared $(a^2)$ halfing said value $(a^2)$ and complimenting the value ($\frac{1}{2} a^2$), obtaining the product $(b=\Delta R(1-a^2/2))$ by multiplying said value $(1-\frac{1}{2}a^2)$ and the compensation value $\Delta R$ which is the difference between the programmed cutter radius and the actual cutter radius, obtaining the difference $(c=r-\Delta R(1-a^2/2))$ by subtracting said product $(b)$ from said accumulated sum $(r)$, obtaining the quotient $d=a\cdot\Delta R/(r-\Delta R(1-a^2/2))$ by multiplying $(a)$ and $\Delta R$, and dividing the product $(a\cdot\Delta R)$ by said difference $(c)$, providing the value $(b)$ as an output of the cutting compensation of the linear control axis and the value $(d)$ as an output of the cutting compensation of the rotational control axis, and;

b. when the incremental control variable of the rotational control axis being zero; providing the compensation value $\Delta R$ as an output of the linear control axis and providing zero output to the rotational control axis.

* * * * *

UNITED STATES PATENT AND TRADEMARK OFFICE
CERTIFICATE OF CORRECTION

PATENT NO. : 4,084,243
DATED : April 11, 1978
INVENTOR(S) : Hajimu Kishi and Masashi Takahashi It is certified that error appears in the above-identified patent and that said Letters Patent are hereby corrected as shown below:

Col. 2, line 40, change "O" second occurrence to --O'--.

Col. 3, line 32, change "$\theta' = \theta + \delta h + \Delta R \cdot a/r'$" to --$\theta' = \theta + \delta\theta = \theta + \Delta R \cdot a/r'$--.

Col. 6, lines 56-57, change "$d = a - \Delta R/(r - \Delta R(1-a^2/2))$" to -- $(d = a \cdot \Delta R)/r - \Delta R (1-a^2/2)$ --.

Col. 6, line 63, change "b." to --(b)--.

Signed and Sealed this

Twelfth Day of September 1978

[SEAL]

Attest:

RUTH C. MASON
*Attesting Officer*

DONALD W. BANNER
*Commissioner of Patents and Trademarks*